(12) United States Patent
Li et al.

(10) Patent No.: US 10,711,383 B2
(45) Date of Patent: Jul. 14, 2020

(54) WATER REUSE CONTROL METHOD OF A MULTI-DRUM WASHING MACHINE

(71) Applicant: QINGDAO HAIER DRUM WASHING MACHINE CO., LTD., Laoshan, Qingdao, Shandong (CN)

(72) Inventors: Wenwei Li, Shandong (CN); Jun Wu, Shandong (CN); Rongshuai Cai, Shandong (CN); Haibo Wang, Shandong (CN); Wenfeng Jiang, Shandong (CN)

(73) Assignee: QINGDAO HAIER DRUM WASHING MACHINE CO., LTD., Qingdao, Shandong (CN)

( * ) Notice: Subject to any disclaimer, the term of this patent is extended or adjusted under 35 U.S.C. 154(b) by 330 days.

(21) Appl. No.: 15/534,740

(22) PCT Filed: Aug. 31, 2015

(86) PCT No.: PCT/CN2015/088592
§ 371 (c)(1),
(2) Date: Jun. 9, 2017

(87) PCT Pub. No.: WO2016/090970
PCT Pub. Date: Jun. 16, 2016

(65) Prior Publication Data
US 2017/0342628 A1 Nov. 30, 2017

(30) Foreign Application Priority Data

Dec. 12, 2014 (CN) .......................... 2014 1 0772399
Dec. 12, 2014 (CN) .......................... 2014 1 0772932

(51) Int. Cl.
*D06F 37/02* (2006.01)
*D06F 29/00* (2006.01)
(Continued)

(52) U.S. Cl.
CPC .............. *D06F 37/02* (2013.01); *D06F 29/00* (2013.01); *D06F 33/00* (2013.01); *D06F 34/22* (2020.02);
(Continued)

(58) Field of Classification Search
None
See application file for complete search history.

(56) References Cited

U.S. PATENT DOCUMENTS 6,618,887 B2* 9/2003 Kim ........................ D06F 23/04
68/23.1
8,418,511 B2* 4/2013 Kim ...................... D06F 39/083
68/208
(Continued)

FOREIGN PATENT DOCUMENTS

| CN | 1727550 A | 2/2006 |
| CN | 202193989 U | 4/2012 |

(Continued)

OTHER PUBLICATIONS

International Search Report (PCT/ISA/210) dated Dec. 4, 2015, by the Chinese Patent Office as the International Searching Authority for International Application No. PCT/CN2015/088592.
(Continued)

*Primary Examiner* — Cristi J Tate-Sims
(74) *Attorney, Agent, or Firm* — Buchanan Ingersoll & Rooney PC

(57) ABSTRACT

A water reuse control method of a multiple-drum washing machine, having a first washing drum and a second washing drum. When the first drum reaches a drainage process, comparing a time for the second drum to reach a water supply process $T_{12}$ to a time for the first drum to reach a next drainage process $T_{11}$; if $T_{12}<T_{11}$, the first drum waits until water is supplied into the second drum; if $T_{12} \geq T_{11}$, water in
(Continued)

Figure 1:
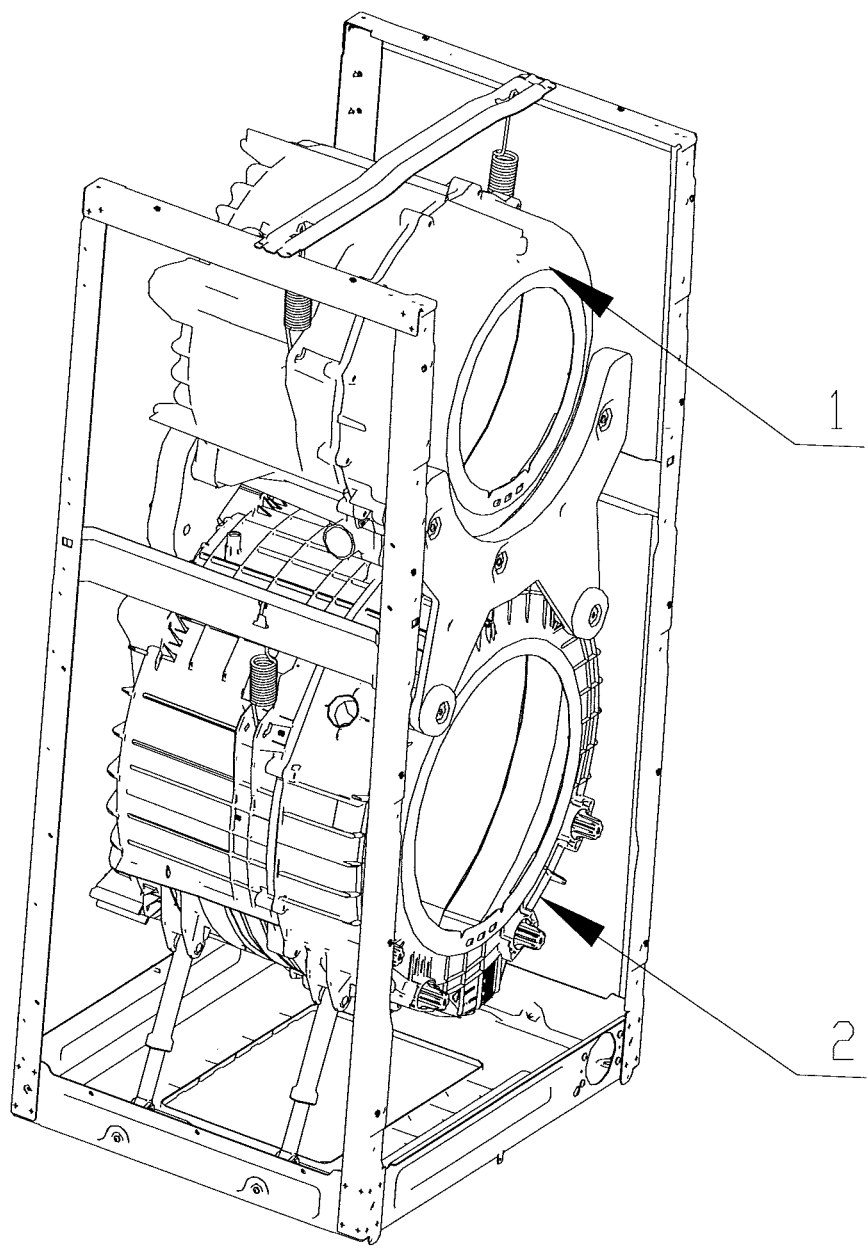

the first drum is directly drained. Alternatively, when the first drum reaches the water supply process, comparing time for the second drum to reach the drainage process $T_{22}$ to time for the first drum to reach a next water supply process $T_{21}$; if $T_{22} \geq T_{21}$, clean water is directly supplied into the first drum; if $T_{22} < T_{21}$, the first drum waits until the second drum drains water.

20 Claims, 4 Drawing Sheets

(51) Int. Cl.
   *D06F 39/00* (2020.01)
   *D06F 33/00* (2020.01)
   *D06F 34/22* (2020.01)
   *D06F 39/08* (2006.01)
   *B01D 15/00* (2006.01)
   *D06F 35/00* (2006.01)

(52) U.S. Cl.
   CPC ............ *D06F 39/006* (2013.01); *D06F 39/08* (2013.01); *B01D 15/00* (2013.01); *D06F 35/00* (2013.01); *D06F 2202/02* (2013.01); *D06F 2202/085* (2013.01); *D06F 2202/12* (2013.01); *D06F 2204/08* (2013.01); *D06F 2220/00* (2013.01); *D06F 2226/00* (2013.01)

(56) References Cited

U.S. PATENT DOCUMENTS

| | | | |
|---|---|---|---|
| 2002/0042957 | A1 | 4/2002 | Kim et al. |
| 2008/0155760 | A1* | 7/2008 | Hoppe .................... D06F 39/02 8/159 |
| 2012/0234054 | A1 | 9/2012 | Kim et al. |
| 2016/0032515 | A1* | 2/2016 | Lee .......................... D06F 13/00 68/27 |

FOREIGN PATENT DOCUMENTS

| | | |
|---|---|---|
| CN | 202369821 U | 8/2012 |
| DE | 29809450 U1 | 9/1999 |
| DE | 20 2007 013 011 U1 | 3/2008 |
| JP | 56-143199 A | 11/1981 |
| KR | 10-2013-0127046 A | 11/2013 |

OTHER PUBLICATIONS

Extended European Search Report dated Dec. 8, 2017 by the European Patent Office in corresponding European Patent Application No. 15866560.4. (4 pages).

* cited by examiner

WATER REUSE CONTROL METHOD OF A MULTI-DRUM WASHING MACHINE

FIELD OF THE INVENTION

The present disclosure relates to a field of washing, more particularly, to a water reuse control method of a multi-drum washing drum washing machine.

BACKGROUND OF THE INVENTION

At present, most of the drum washing machines on sale in the market have only one washing drum. With the strengthening of people's health awareness, more and more users need to separate the different types of clothing to wash or to wash a small amount of clothing in a timely manner.

With the improvement of people's quality of life, people's health awareness has gradually increased, especially in the family clothing washing, more and more people wash clothes separately. If using the existing washing machine to take multiple laundry, the laundry time is hard to meet the requirements of the users. If buying two or more washing machines to wash separately at the same time, it will not only bring a great waste of energy and water resources but also occupy a large space, which is not suitable for home use. Therefore, the use of multi-drum washing machine will meet the needs above and solve the problem of energy, water and space waste.

A patent No. CN201120326451.6 discloses a washing machine, at least comprising two washing drums. The washing drums are communicated with each other through a connecting pipe, a control valve and a pump are provided on the connecting pipe. The use of the control valve and the pump achieves the mutual use of washing water in the two washing drums. However, it doesn't disclose the control method of water mutual use. In practical application, water in the two washing drums sometimes can be mutual used but sometimes cannot used. If whether the water can be reused is only selected manually, users can only constantly observe the washing machine and operate when they are at home. There are limitations of operational inconvenience and inaccurate flaws of determination. The present disclosure develops an automatic and intelligent water reuse control method of a multi-drum washing machine.

In the view of foregoing, the present disclosure is proposed.

SUMMARY OF THE INVENTION

An object of the present disclosure is to overcome the shortcomings of the prior art, and provides a water reuse control method of a multi-drum washing machine to realize the full reuse of water.

In order to achieve such object, the technical scheme is adopted by the present disclosure as follows: a water reuse control method of a multi-drum washing machine. The multi-drum washing machine at least comprises a first washing drum and a second washing drum, when the first washing drum and the second washing drum are operating at the same time and when the first washing drum reaches a drainage process, it is compared a time $T_{12}$ for reaching a water supply process of the second washing drum and a time $T_{11}$ for reaching a next drainage process of the first washing drum. If $T_{12}<T_{11}$, the first washing drum waits until the second washing drum supplies water. If $T_{12} \geq T_{11}$, the water in the first washing drum is drained directly.

Set an allowable waiting time $T_1$, which $T_1<T_{11}$. It is compared a time $T_{12}$ for reaching a water supply process of the second washing drum and the setting allowable waiting time $T_1$. If $T_{12}<T_1$, the first washing drum waits until the second washing drum supplies water. If $T_{12} \geq T_1$, the water in the first washing drum is drained directly, preferably the longest waiting time of the first washing drum is 30 mins.

It is determined whether or not the water in the first washing drum can be reused before comparing the time $T_{12}$ for reaching the water supply process of the second washing drum and the time $T_{11}$ for reaching the next drainage process of the first washing drum. If no, the water in the first washing drum is drained directly. If yes, it is compared the time $T_{12}$ for reaching the water supply process of the second washing drum and the time $T_{11}$ for reaching the next drainage process of the first washing drum.

Or, it is determined whether or not the water in the first washing drum can be reused when the first washing drum waits until the second washing drum supplies water. If no, the water in the first washing drum is drained directly. If yes, the water in the first washing drum is drained into the second washing drum for reusing.

If the second washing drum is supplying water when the first washing drum reaches the drainage process, the time $T_{12}$ for reaching the water supply process of the second washing drum is 0, and no need to wait.

A turbidity value or a bubble concentration value of the water in the first washing drum is detected. If the turbidity value or the bubble concentration value of the water is smaller than a set value, the water in the first washing drum can be reused. Otherwise the water in the first washing drum cannot be reused and is drained away directly.

When the first washing drum reaches the drainage process, it is determined whether or not the process of which the second washing drum is in progress or is about to be performed is a water supply for a last rinse. If yes, the water in the first washing drum is drained directly. If no, it is continued to be determined whether or not the water in the first washing drum can be reused.

Before the water in the first washing drum is drained into the second washing drum, it is determined whether or not the second washing drum executes the water supply process for washing. If yes, the second washing drum first supplies water for washing the detergent box. After the completion of water supply for washing the detergent box of the second washing drum, the water in the first washing drum is drained into the second washing drum. If no, the water in the first washing drum is drained into the second washing drum directly.

When the water in the first washing drum is drained into the second washing drum, a height of the water level in the second washing drum is detected. If the water level in the second washing drum reaches a set water level value and there is water left in the first washing drum, the remaining water in the first washing drum is discharged directly. If the water in the first washing drum is entirely drained into the second washing drum and the water level in the second washing drum does not reach the set water level value, then the second washing drum supplies clean water.

When the water in the first washing drum is drained away directly, it is determined whether or not the second washing drum is executing the dehydration process. If yes, the first washing drum waits until the dehydration process of the second washing drum is completed, and then drains. If no, a time for reaching the dehydration process of the second washing drum is $T_{32}$, a time taken for the second washing drum to dehydrate is $T_{33}$, an allowable waiting time $T_3$ is set.

If $T_{32}+T_{33}<T_3$, the first washing drum waits until the dehydration process of the second washing drum is completed, and then drains. Otherwise, the water in the first washing drum is drained directly.

The water in the first washing drum cannot be reused, if the first washing drum is in a washing process when it drains and the second washing drum is in a rinse process when it supplies water; or if the first washing drum and the second washing drum are both in the washing process when the first washing drum drains and the second washing drum supplies water, and washing times of the first washing drum is less than washing times of the second washing drum; or if the first washing drum and the second washing drum are both in the rinse process when the first washing drum drains and the second washing drum supplies water, and rinsing times of the first washing drum is less than rinsing times of the second washing drum.

When the second washing drum reaches the drainage process, it is compared the time for reaching the water supply process of the first washing drum and the time for reaching the next drainage process of the second washing drum, it is determined whether or not the second washing drum waits until the first washing drum executes the water supply process.

A water reuse control method of a multi-drum washing machine is provided, and the multi-drum washing machine at least comprises a first washing drum and a second washing drum. When the first washing drum and the second washing drum are both in the working state at the same time, the water reuse control method is as follows: when the first washing drum reaches the water supply process, it is compared a time $T_{22}$ for reaching a drainage process of the second washing drum and a time $T_{21}$ for reaching a next water supply process of the first washing drum. If $T_{22} \geq T_{21}$, the first washing drum supplies clean water directly. If $T_{22}<T_{21}$, the first washing drum waits until a start of the drainage process of the second washing drum.

An allowable waiting time $T_2$ is set, which $T_2<T_{21}$. It is compared the time $T_{22}$ for reaching a drainage process of the second washing drum and the setting allowable waiting time $T_2$. If $T_{22}<T_2$, the first washing drum waits until the second washing drum drains. If $T_{22} \geq T_2$, the first washing drum supplies clean water directly. Preferably, a longest waiting time of the first washing drum is 30 mins.

It is determined whether or not the water in the second washing drum can be reused before comparing the time $T_{22}$ for reaching the drainage process of the second washing drum and the time $T_{21}$ for reaching the next water supply process of the first washing drum. If no, the water in the first washing drum supplies clean water directly. If yes, it is compared the time $T_{22}$ for reaching the drainage process of the second washing drum and the time $T_{21}$ for reaching the next water supply process of the first washing drum. Or, it is determined whether or not the water in the second washing drum can be reused when the first washing drum waits until the start of the drainage process of the second washing drum. If no, the first washing drum supplies clean water directly. If yes, the water in the second washing drum is drained into the first washing drum for reusing.

If the second washing drum is draining water when the first washing drum reaches the water supply process, the time $T_{22}$ for reaching the drainage process of the second washing drum is 0, and no need to wait.

A turbidity value or a bubble concentration value of the water in the second washing drum is detected. If the turbidity value or the bubble concentration value of the water is smaller than the set value, the water in the second washing drum can be reused. Otherwise the water in the second washing drum cannot be reused.

When the first washing drum reaches the drainage process, it is determined whether or not the water supply process being executed is a water supply for a last rinse. If yes, the first washing drum supplies clean water directly. If no, it is continued to compare the time $T_{22}$ for reaching the drainage process of the second washing drum and the time $T_{21}$ for reaching the next water supply process of the first washing drum.

Before the water in the second washing drum is drained into the first washing drum, it is determined whether or not the first washing drum executes the water supply process for washing. If yes, the first washing drum first supplies water for washing the detergent box. After the completion of water supply for washing the detergent box of the first washing drum, the water in the second washing drum is drained into the first washing drum. If no, the water in the second washing drum is drained into the first washing drum directly.

When the water in the second washing drum is drained into the first washing drum, a height of the water level in the first washing drum is detected. If the water level in the first washing drum reaches the set water level value and there is water in the second washing drum, a remaining water in the second washing tub is discharged directly. If the water in the second washing drum is entirely drained into the first washing drum and the water level in the first washing tub does not reach the set water level value, then the first washing drum supplies clean water.

Before the water in the second washing drum is drained away directly, it is determined whether or not the first washing drum is executing the dehydration process. If yes, the second washing drum waits until the dehydration process of the first washing drum is completed, and then drains. If no, it is determined a time for reaching the dehydration process of the first washing drum is $T_{41}$, a time taken for the first washing drum to dehydrate is $T_{44}$, and an allowable waiting time $T_4$ is set. If $T_{41}+T_{44}<T_4$, the second washing drum waits until the dehydration process of the first washing drum is completed, and then drains. Otherwise, the water of the second washing drum is drained directly.

The water in the first washing drum cannot be reused, if the second washing drum is in a washing process when it drains and the first washing drum is in a rinse process when it supplies water; or if the first, second washing drums are both in the washing process when the second washing drum drains and the first washing drum supplies water, and washing times of the second washing drum is less than washing times of the first washing drum; or if the first, second washing drums are both in the rinse process when the second washing drum drains and the first washing drum supplies water, and rinsing times of the second washing drum is less than rinsing times of the first washing drum.

When the second washing drum reaches the water supply process, it is compared the time for reaching the drainage process of the first washing drum and the time for reaching the next water supply of the second washing drum, it is determined whether or not the second washing drum waits until the first washing drum drains.

By adopting the technical scheme of the present disclosure, it brings the following benefits:

1. The present disclosure according to the drainage waiting time to determine whether or not to wait for the water to be discharged to another drum for reuse when the drainage process is reached. It has a simple determination and control logic and has higher control stability in an actual washing process. At the same time, it makes full reuse of washing water and has a high practical value and is more effective to promote the application. The present disclosure, according to the water supply waiting time, determines whether or not to wait for the water to be discharged to another drum for reuse when the water supply process is reached. It has a simple determination and control logic and has higher control stability in an actual washing process. At the same time, it makes full reuse of washing water and has a high practical value and is more effective to promote the application.

2. The present disclosure adds the detection and control of water quality and ensures the reliability of water reuse.

3. The present disclosure adds the water supply determination process and ensures the washing process of the detergent during the water supply.

4. The present disclosure adds the water level monitoring process and avoids excessive water flow into the lower drum.

5. The present disclosure accurately determines that the water cannot be reused and ensures the washing effect.

The following is further described in details with embodiments of the present disclosure.

BRIEF DESCRIPTION OF THE INVENTION

FIG. 1: A structural diagram of a double-drum washing machine of the present disclosure FIG. 2: A flow chart of a control method of the present disclosure FIG. 3: A flow chart of a control method of another embodiment of the present disclosure FIG. 4: A flow chart of a control method of another embodiment of the present disclosure Wherein: 1. A first washing drum, 2. A second washing drum

DETAILED DESCRIPTION OF THE INVENTION

As shown in FIG. 1, a double-drum washing machine which provides with a first washing drum 1 and a second washing drum 2 capable of independently performing washing steps. The first washing drum 1 and the second washing drum 2 can respectively and independently execute a water supply process, a washing process, a drainage process, a rinse process, and a dehydration process in turn for clothes, which is to achieve the purpose of washing clothes. Preferably, the first washing drum and the second washing drum may also be separately provided with a drying means for executing a drying process after the dehydration process to achieve the purpose of drying the clothes in the first washing drum and/or the second washing drum. Preferably, the first washing drum is provided with a first heater for heating the washing water therein, and the second washing drum is provided with a second heater for heating the washing water therein. Thus, during the execution of the washing process, the washing water in the washing drum is subjected to a heat treatment to control the water temperature during the washing process and the washing effect is improved.

In the present disclosure, the first washing drum is communicated with the second washing drum. The water in the first washing drum can be drained into the second washing drum for reuse under a certain condition, and the water in the second washing drum can be drained into the first washing drum for reuse under a certain condition. If the condition for reuse is not met, water is drained away through a drainage pipe directly. Thus, it improves the water utilization and avoids the waste of water. At the same time, a control process is added to ensure that the water is only be reused when the water is relatively clean, and ensure the washing effect.

Embodiment 1

Figure 2:
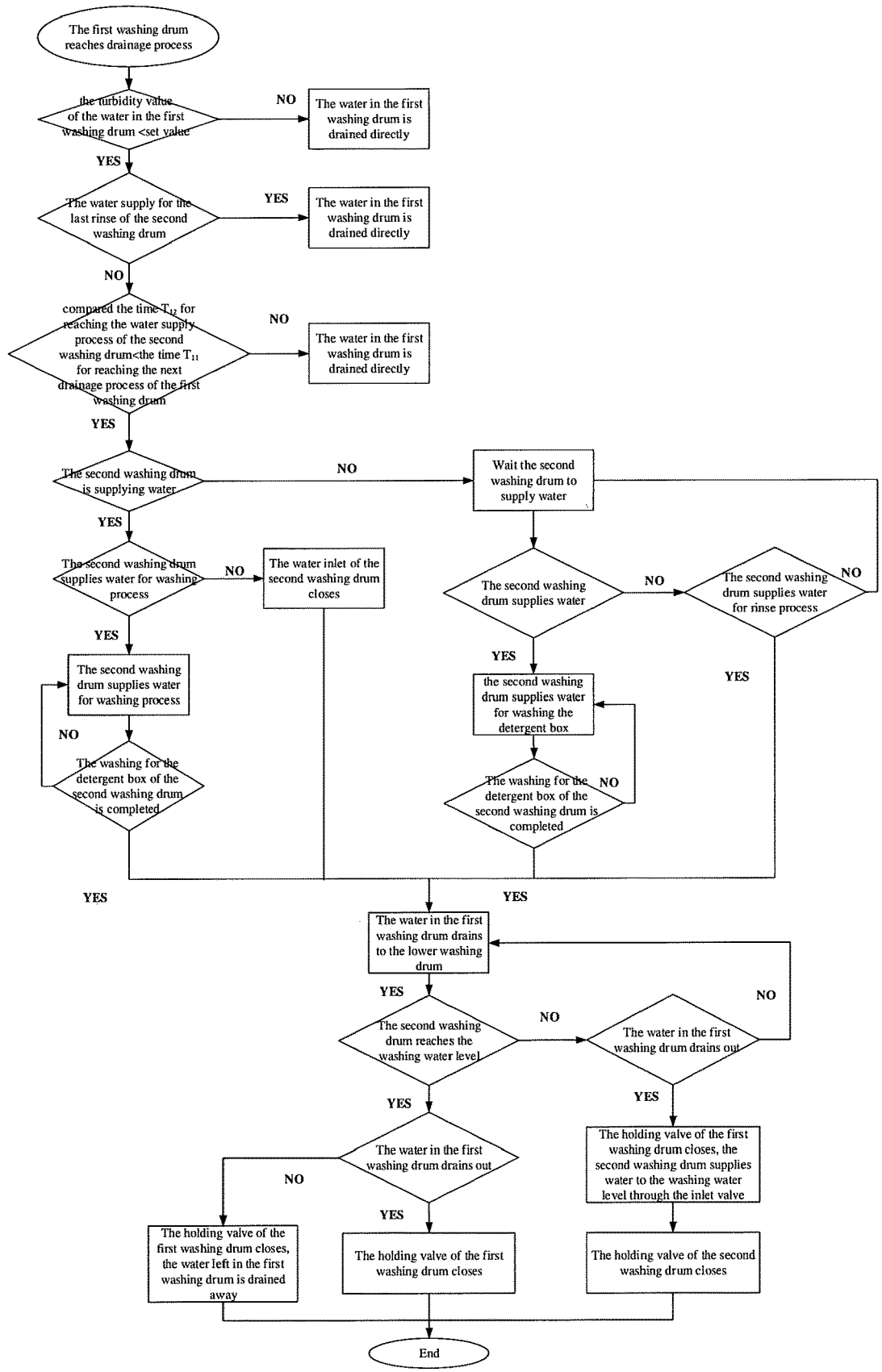

As shown in FIG. 2, the present embodiment uses the drainage waiting time as a criterion to determine whether or not to reuse the water. According to the drainage waiting time, it is determined whether or not to wait for the water to be discharged to another drum for reuse when the drainage process is reached. It has a simple determination and control logic and has higher control stability in an actual washing process. And it makes full reuse of washing water and has a high practical value and is more effective to promote the application.

When the first washing machine and the second washing machine are both operating at the same time, the water reuse control method is as follows:

A water reuse control method of a multi-drum washing machine is provided. The multi-drum washing machine at least comprises a first washing drum and a second washing drum, when the first washing drum and the second washing drum are operating at the same time and when the first washing drum reaches a drainage process, it is compared a time $T_{12}$ for reaching a water supply process of the second washing drum and a time $T_{11}$ for reaching a next drainage process of the first washing drum. If $T_{12}<T_{11}$, the first washing drum waits until the second washing drum supplies water, but the longest waiting times for both washing drums are 30 mins. If $T_{12} \geq T_{11}$, the water in the first washing drum is drained directly.

It is determined whether or not the water in the first washing drum can be reused before comparing the time $T_{12}$ for reaching the water supply process of the second washing drum and the time $T_{11}$ for reaching the next drainage process of the first washing drum. If no, the water in the first washing drum is drained directly. If yes, it is compared the time $T_{12}$ for reaching the water supply process of the second washing drum and the time $T_{11}$ for reaching the next drainage process of the first washing drum.

Or, it is determined whether or not the water in the first washing drum can be reused when the first washing drum waits until the start of the water supply process of the second washing drum. If no, the water in the first washing drum is drained directly. If yes, the water in the first washing drum is drained into the second washing drum for reuse.

Specifically, it comprises step 1: when the first washing drum reaches the drainage process, it is determined whether or not the water in the first washing drum can be reused, if yes, execute step 2, if no, the water in the first washing drum is drained directly;

step 2: it is compared a time $T_{12}$ for reaching a water supply process of the second washing drum and a time $T_{11}$ for reaching a next drainage process of the first washing drum. If $T_{12}<T_{11}$, the first washing drum waits until a start of water supply process of the second washing drum and the water in the first washing drum is drained into the second washing drum to reuse. If $T_{12} \geq T_{11}$, the water in the first washing drum is drained directly. By adding the process of the determination of whether or not to wait, to a large extent it increases the water reuse probability of the first washing drum, and more water can be reused.

In step 1, if the second washing drum is supplying water when the first washing drum reaches the drainage process, the time $T_{12}$ for reaching the water supply process of the second washing drum is 0, and no need to wait. The water in the first washing drum is drained into the second washing drum for reuse. It is also possible to first determine whether or not the second washing drum is currently executing the water supply process before comparing the time $T_{12}$ for reaching the water supply process of the second washing drum and the time $T_{11}$ for reaching a next drainage process of the first washing drum. If the second washing drum is not subjected to the water supply process, then it is compared the time $T_{12}$ for reaching the water supply process of the second washing drum and the time $T_{11}$ for reaching a next drainage process of the first washing drum.

In step 2, an allowable waiting time $T_1$ is set, which $T_1 < T_{11}$. If $T_{12} < T_1$, the first washing drum waits until the second washing drum supplies water and the water in the first washing drum is drained into the second washing drum for reuse. If $T_{12} \geq T_1$, the water in the first washing drum is drained directly. This step can avoid the first washing drum waiting too long and reasonably arrange the water reuse under the premise of ensuring the washing time of the first washing drum. Thus, it will not waste too much time of the first washing drum because of only considering water reuse. If the washing machine determines that the waiting time is too long and exceeds the set allowable waiting time, the water in the first washing drum is not reused. The determination makes the reuse of water more reasonable, optimizing the relationship between waiting time and water reuse to a large extent.

In step 1, the turbidity value or the bubble concentration value of the water in the first washing drum is detected. If the turbidity value or the bubble concentration value of the water is smaller than the set value, the water in the first washing drum can be reused. Otherwise the water in the first washing drum cannot be reused and is drained away directly. Water can be reused when the turbidity value or bubble concentration value of the water is within the set range.

In step 1, when the first washing drum reaches the drainage process, it is determined whether or not the process of which the second washing drum is in progress or is about to be performed is a water supply for a last rinse. If yes, the water in the first washing drum is drained directly. If no, it is continued to be determined whether or not the water in the first washing drum can be reused. Thus to ensure that the water supplied in the last rinse process is clean water, which ensures that the effect of washing clothes after washing.

In step 2, before the water in the first washing drum is drained into the second washing drum, it is determined whether or not the second washing drum executes the water supply process for washing. If yes, the second washing drum first supplies water for washing the detergent box. After the completion of water supply for washing the detergent box of the second washing drum, the water in the first washing drum is drained into the second washing drum. If no, the water in the first washing drum is drained into the second washing drum directly.

In step 2, when the water in the first washing drum is drained into the second washing drum, the height of the water level in the second washing drum is detected. If the water level in the second washing drum reaches the set water level value and there is water in the first washing drum, the remaining water of the first washing drum is discharged directly. If the water in the first washing drum is entirely drained into the second washing drum and the water level in the second washing drum does not reach the set water level value, then the second washing drum supplies clean water through an external water inlet.

When the water in the first washing drum is drained away directly, it is determined whether or not the second washing drum is executing the dehydration process. If yes, the first washing drum waits until the dehydration process of the second washing drum is completed, and then drains. If no, it is determined a time $T_{32}$ for reaching the dehydration process of the second washing drum, a time $T_{33}$ taken for the second washing drum to dehydrate, and an allowable waiting time $T_3$ is set. If $T_{32}+T_{33}<T_3$, the first washing drum waits until the dehydration process of the second washing drum is completed, and then drains. Otherwise, the water in the first washing drum is drained directly.

It is also possible to determine whether or not the water in the first washing drum can be reused by determining the washing state and the washing times. In step 1, the water in the first washing drum cannot be reused, if the first washing drum is in a washing process when it drains and the second washing drum is in a rinse process when it supplies water; or if the first washing drum and the second washing drum are both in the washing process when the first washing drum drains and the second washing drum supplies water, and washing times of the first washing drum is less than washing times of the second washing drum; or if the first washing drum and the second washing drum are both in the rinse process when the first washing drum drains and the second washing drum supplies water, and rinsing times of the first washing drum is less than rinsing times of the second washing drum.

When the second washing drum reaches the drainage process, it is determined whether or not the water in the second washing drum can be reused. If yes, comparing the time for reaching the water supply process of the first washing drum and the time for reaching the next drainage process of the second washing drum, it is determined whether or not the second washing drum waits until the first washing drum executes the water supply process.

The drainage outlet of the first washing drum is communicated with the second washing drum, and the water in the first washing drum can be drained into the second washing drum to reuse. The drainage outlet of the first washing drum is provided with a holding valve, the water in the first washing drum can flow through the holding valve into the second washing drum. The second washing drum is provided with an inlet valve and the clean water can flow into the second washing drum through the inlet valve. The control method is as follows:

1) The first washing drum reaches the drainage process,
2) It is determined whether or not the water in the first washing drum can be reused, if yes, execute step 3), if no, execute step 6),
3) It is determined a time $T_{11}$ for reaching a next drainage process of the first washing drum, and a time $T_{12}$ for reaching a water supply process of the second washing drum, if $T_{12}<T_{11}$, execute step 4), if $T_{12} \geq T_{11}$, execute step 6),
4) The first washing drum waits until the second washing drum supplies water, execute step 5),
5) The water in the first washing drum is drained into the second washing drum,
6) The water in the first washing drum is drained away directly.

The control method can also add a process of determining whether or not the second washing drum is supplying water before comparing the time for reaching the next drainage process of the first washing drum and the time for reaching executing the water supply process of the second washing drum. The control method is as follows:

1) The first washing drum reaches the drainage process,

2) It is determined whether or not the water in the first washing drum can be reused, if yes, execute step 3), if no, execute step 7), 3) It is determined whether or not the second washing drum is executing the water supply process, if no, execute step 4), if yes, execute step 6), 4) It is determined a time $T_{11}$ for reaching a next drainage process of the first washing drum, a time $T_{12}$ for reaching a water supply process of the second washing drum, if $T_{12}<T_{11}$, execute step 5), if $T_{12}\geq T_{11}$, execute step 7), 5) The first washing drum waits until the second washing drum supplies water, execute step 6), 6) The water in the first washing drum is drained into the second washing drum, 7) The water in the first washing drum is drained away directly.

The control method may also include determining whether or not the first washing drum have enough time to wait the second washing drum supplying water, the control method is as follows:

1) The first washing drum reaches the drainage process,

2) It is determined whether or not the water in the first washing drum can be reused, if yes, execute step 3), if no, execute step 8), 3) It is determined whether or not the second washing drum is executing the water supply process, if no, execute step 4), if yes, execute step 7), 4) It is determined a time $T_{11}$ for reaching a next drainage process of the first washing drum, a time $T_{12}$ for reaching a water supply process of the second washing drum, if $T_{12}<T_{11}$, execute step 5), if $T_{12}\geq T_{11}$, execute step 8), 5) Set an allowable waiting time $T_1$, if $T_{12}<T_1$, execute step 6), if $T_{12}\geq T_1$, execute step 8), 6) The first washing drum waits until the second washing drum supplies water, execute step 7), 7) The water in the first washing drum is drained into the second washing drum, 8) The water in the first washing drum is drained away directly.

If the water in the first washing drum is too dirty or water supply process of the second washing drum is for the last rinse, the water in the first washing drum cannot be reused as well. The control method is as follows:

1) The first washing drum reaches the drainage process,

2) The turbidity value or the bubble concentration value of the water in the first washing drum is detected to determine whether or not the turbidity value or the bubble concentration value is smaller than the set value, If yes, execute step 3), if no, execute step 9), 3) It is determined whether or not the second washing drum has only the last rinse left, if no, execute step 4), if yes, execute step 9), 4) It is determined whether or not the second washing drum is executing water supply process, if no, execute step 5), if yes, execute step 8), 5) It is determined a time $T_{11}$ for reaching a next drainage process of the first washing drum, a time $T_{12}$ for reaching a water supply process of the second washing drum, if $T_{12}<T_{11}$, execute step 6), if $T_{12}\geq T_{11}$, execute step 9), 6) Set an allowable waiting time $T_1$, if $T_{12}<T_1$, execute step 7), if $T_{12}\geq T_1$, execute step 9), 7) The first washing drum waits until the second washing drum supplies water, execute step 8), 8) The water in the first washing drum is drained into the second washing drum, 9) The water in the first washing drum is drained away directly.

When the water in the first washing drum is drained into the second washing drum and if the water supply of the second washing drum is for washing, the detergent box need to be washed and water level need to be detected. The control method is as follows:

1) The first washing drum reaches the drainage process,

2) The turbidity value or the bubble concentration value of the water in the first washing drum is detected to determine whether or not the turbidity value or the bubble concentration value is smaller than the set value. If yes, execute step 3), if no, execute step 12), 3) It is determined whether or not the second washing drum has only the last rinse left, if no, execute step 4), if yes, execute step 12), 4) It is determined whether or not the second washing drum is executing water supply process, if no, execute step 5), if yes, execute step 10), 5) It is determined a time $T_{11}$ for reaching a next drainage process of the first washing drum, a time $T_{12}$ for reaching a water supply process of the second washing drum, if $T_{12}<T_{11}$, execute step 6), if $T_{12}\geq T_{11}$, execute step 12), 6) Set an allowable waiting time $T_1$, if $T_{12}<T_1$, execute step 7), if $T_{12}\geq T_1$, execute step 12), 7) It is determined whether or not the second washing drum is executing the water supply process for washing, if yes, execute step 8), if no, execute step 10), 8) The second washing drum first supplies water for washing the detergent box, after the completion of water supply for washing the detergent box of the second washing drum, execute step 9), 9) The first washing drum waits until the second washing drum supplies water, execute step 10), 10) The water in the first washing drum is drained into the second washing drum, 11) Detect the height of the water level in the second washing drum. When the water level in the second washing drum reaches the set water level value and if there is still water left in the first washing drum, the left water is drained away directly. If the water level in the second washing drum still not reaches the set water level value after the water in the first washing drum is entirely drained into the second washing drum, clean water is flooded into the second washing drum.

12) The water in the first washing drum is drained away directly.

The first washing drum and the second washing drum of the present embodiment are only for the sake of convenience of the description, regardless of the order of the relationship. It may also reuse the water in the second washing drum, the drainage outlet of the second washing drum is communicated with the first washing drum. The water in the second washing drum can be drained into the first washing drum for reuse. The drainage outlet of the second washing drum is provided with a holding valve and the water in the second washing drum can flow into the first washing drum through the holding valve. The first washing drum is provided with an inlet valve, clean water from outside can flow into the first washing drum through the inlet valve. When one washing drum reaches the drainage process, it is determined whether or not the water of the washing drum is drained into the other washing drum for reuse. And when the other washing drum reaches the drainage process, it doesn't need to consider the water reuse of the other washing drum. It avoids causing an infinite loop of both washing drums waiting. The control method is as follows:

1) The second washing drum reaches the drainage process,

2) It is determined whether or not the water in the second washing drum can be reused, if yes, execute step 3), if no, execute step 6), 3) It is determined a time $T_{11}$ for reaching a next drainage process of the second washing drum, a time $T_{12}$ for reaching a water supply process of the first washing drum, if $T_{12}<T_{11}$, execute step 4), if $T_{12}\geq T_{11}$, execute step 6), 4) The second washing drum waits until the first washing drum supplies water, execute step 5), 5) The water in the second washing drum is drained into the first washing drum, 6) The water in the second washing drum is drained away directly.

The control method can also add a process of determining whether or not the first washing drum is supplying water before comparing the time for reaching the next drainage process of the second washing drum and the time for reaching executing the water supply process of the first washing drum. The control method is as follows:

1) The second washing drum reaches the drainage process,

2) It is determined whether or not the water in the second washing drum can be reused, if yes, execute step 3), if no, execute step 7), 3) It is determined whether or not the first washing drum is executing the water supply process, if no, execute step 4), if yes, execute step 6), 4) It is determined a time $T_{11}$ for reaching a next drainage process of the second washing drum, a time $T_{12}$ for reaching a water supply process of the first washing drum, if $T_{12}<T_{11}$, execute step 5), if $T_{12}\geq T_1$, execute step 7), 5) The second washing drum waits until the first washing drum supplies water, execute step 6), 6) The water in the second washing drum is drained into the first washing drum, 7) The water in the second washing drum is drained away directly.

The control method may also include determining whether or not the second washing drum have enough time to wait the first washing drum supplying water, the control method is as follows:

1) The second washing drum reaches the drainage process,

2) It is determined whether or not the water in the second washing drum can be reused, if yes, execute step 3), if no, execute step 8), 3) It is determined whether or not the first washing drum is executing the water supply process, if no, execute step 4), if yes, execute step 7), 4) It is determined a time $T_{11}$ for reaching a next drainage process of the second washing drum, a time $T_{12}$ for reaching a water supply process of the first washing drum, if $T_{12}<T_{11}$, execute step 5), if $T_{12}\geq T_{11}$, execute step 8), 5) Set an allowable waiting time $T_1$, if $T_{12}<T_1$, execute step 6), if $T_{12}\geq T_1$, execute step 8), 6) The second washing drum waits until the first washing drum supplies water, execute step 7), 7) The water in the second washing drum is drained into the first washing drum, 8) The water in the second washing drum is drained away directly.

If the water in the second washing drum is too dirty or water supply process of the first washing drum is for the last rinse, the water in the second washing drum cannot be reused. The control method is as follows:

1) The second washing drum reaches the drainage process,

2) The turbidity value or the bubble concentration value of the water in the second washing drum is detected to determine whether or not the turbidity value or the bubble concentration value is smaller than the set value, if yes, execute step 3), if no, execute step 9), 3) It is determined whether or not the first washing drum has only the last rinse left, if no, execute step 4), if yes, execute step 9), 4) It is determined whether or not the first washing drum is executing the water supply process, if no, execute step 5), if yes, execute step 8), 5) It is determined a time $T_{11}$ for reaching a next drainage process of the second washing drum, a time $T_{12}$ for reaching a water supply process of the first washing drum, if $T_{12}<T_{11}$, execute step 6), if $T_{12}\geq T_{11}$, execute step 9), 6) Set an allowable waiting time $T_1$, if $T_{12}<T_1$, execute step 7), if $T_{12}\geq T_1$, execute step 9), 7) The second washing drum waits until the first washing drum supplies water, execute step 8), 8) The water in the second washing drum is drained into the first washing drum, 9) The water in the second washing drum is drained away directly.

When the water in the second washing drum is drained into the first washing drum and if the water supply of the first washing drum is for washing, the detergent box needs to be washed and water level needs to be detected. The control method is as follows:

1) The second washing drum reaches the drainage process,

2) The turbidity value or the bubble concentration value of the water in the second washing drum is detected to determine whether or not the turbidity value or the bubble concentration value is smaller than the set value, if yes, execute step 3), if no, execute step 12), 3) It is determined whether or not the first washing drum only has water supply for the last rinse left, if no, execute step 4), if yes, execute step 12), 4) It is determined whether or not the first washing drum is executing the water supply process, if no, execute step 5), if yes, execute step 10), 5) It is determined a time $T_{11}$ for reaching a next drainage process of the second washing drum, a time $T_{12}$ for reaching a water supply process of the first washing drum, if $T_{12}<T_{11}$, execute step 6), if $T_{12}\geq T_{11}$, execute step 12), 6) Set an allowable waiting time $T_1$, if $T_{12}<T_1$, execute step 7), if $T_{12}\geq T_1$, execute step 12), 7) It is determined whether or not the first washing drum executes the water supply process, if yes, execute step 8), if no, execute step 10), 8) The first washing drum first supplies water for washing the detergent box, after the completion of water supply for washing the detergent box of the first washing drum, execute step 9), 9) The second washing drum waits until the first washing drum supplies water, execute step 10), 10) The water in the second washing drum is drained into the first washing drum, 11) Detect the height of the water level in the first washing drum. When the water level in the first washing drum reaches the set water level value and if there is still water left in the second washing drum, the left water is drained away directly. If the water level in the first washing drum does still not reach the set water level value after the water in the second washing drum is entirely drained into the first washing drum, water from outside is flooded into the first washing drum through the water inlet, 12) The water in the second washing drum is drained away directly.

Embodiment 2

Figure 3:
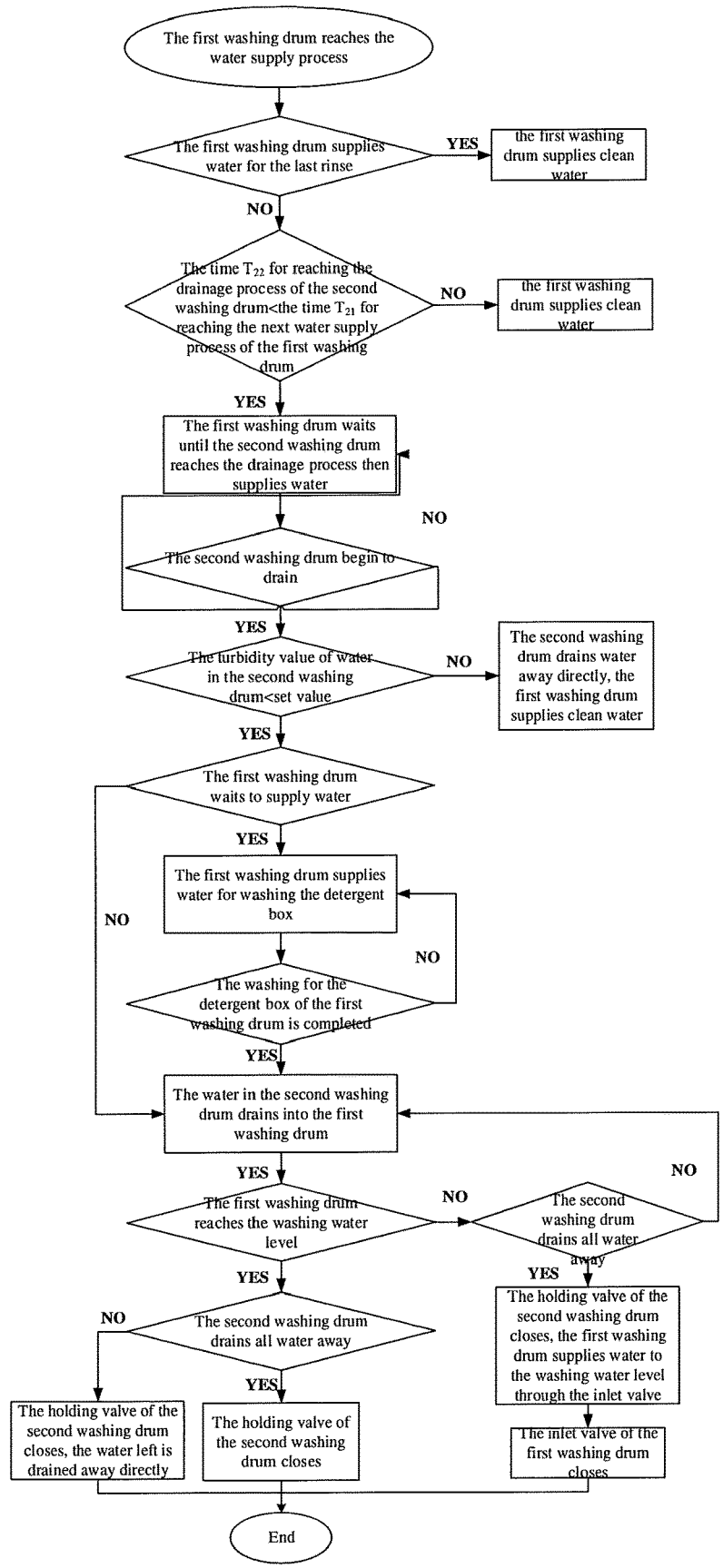

As shown in FIG. 3, the present embodiment uses the waiting time of the water supply as criterion to determine whether or not to reuse the water. According to the waiting time of water supply, it is determined whether to reuse water drained from the other washing drum when one washing drum reaches the water supply process. The method has a simple judgment and control logic; the control stability is high in the actual washing process. At the same time, it achieves a full reuse of water, and the practical value is high, which is more effective to promote and apply.

When the first washing drum and the second washing drum are both in the working state at the same time, the water reuse control method is as follows:

A water reuse control method of a multi-drum washing machine is provided, and the multi-drum washing machine at least comprises a first washing drum and a second washing drum. When the first washing drum and the second washing drum are both in the working state at the same time, the water reuse control method is as follows: when the first washing drum reaches the drainage process, it is compared a time $T_{22}$ for reaching a drainage process of the second washing drum and a time $T_{21}$ for reaching a next water supply process of the first washing drum. If $T_{22} \geq T_{21}$, the first washing drum supplies clean water directly. If $T_{22} < T_{21}$, the first washing drum waits until a start of the drainage process of the second washing drum. However, the longest waiting times for both drums are 30 mins.

It is determined whether or not the water in the second washing drum can be reused before comparing the time $T_{22}$ for reaching the drainage process of the second washing drum and the time $T_{21}$ for reaching the next water supply process of the first washing drum. If no, the water in the first washing drum supplies clean water directly. If yes, it is compared the time $T_{22}$ for reaching the drainage process of the second washing drum and the time $T_{21}$ for reaching the next water supply process of the first washing drum. Or, it is determined whether or not the water in the second washing drum can be reused when the first washing drum waits until the start of the drainage process of the second washing drum. If no, the first washing drum supplies clean water directly. If yes, the water in the second washing drum is drained into the first washing drum for reuse.

Specific step 1: when the first washing drum reaches the water supply process, it is compared the time $T_{22}$ for reaching the drainage process of the second washing drum and the time $T_{21}$ for reaching the next water supply process of the first washing drum. If $T_{22} \geq T_{21}$, the first washing drum supplies clean water directly. If $T_{22} < T_{21}$, the first washing drum waits until a start of the drainage process of the second washing drum, execute step 2;

Step 2: it is determined whether or not the water in the second washing drum can be reused. If yes, the water in the second washing drum is drained into the first washing drum to reuse, if no, the first washing drum supplies clean water directly. By adding the process of the determination of whether or not to wait, to a large extent it increases the water reuse probability of the second washing drum, and more water can be reused.

In step 1, if the second washing drum is draining water when the first washing drum reaches the water supply process, the time $T_{22}$ for reaching the drainage process of the second washing drum is 0, and no need to wait, and directly executes step 2. It is also possible to first determine whether or not the second washing drum is currently executing the drainage process before comparing the time $T_{22}$ for reaching the drainage process of the second washing drum and the time $T_{21}$ for reaching the next water supply process of the first washing drum. If the second washing drum is not subjected to the drainage process, then it is compared the time $T_{22}$ for reaching the drainage process of the second washing drum and the time $T_{21}$ for reaching the next water supply process of the first washing drum.

In step 1, an allowable waiting time $T_2$ is set, which $T_2 < T_{21}$. If $T_{22} < T_2$, the first washing drum waits until the second washing drum drains, and executes step 2. If $T_{22} \geq T_2$, the first washing drum supplies clean water directly. This step can avoid the first washing drum waiting too long and reasonably arrange the water reuse under the premise of ensuring the washing time of the first washing drum. Thus, it will not waste too much time of the first washing drum because of only considering water reuse. If the washing machine determines that the waiting time is too long and exceeds the set allowable waiting time, the first washing drum will not reuse the water in the second washing drum. The determination makes the reuse of water more reasonable, optimizing the relationship between waiting time and water reuse to a large extent.

In step 2, the turbidity value or the bubble concentration value of the water in the second washing drum is detected. If the turbidity value or the bubble concentration value of the water is smaller than the set value, the water in the second washing drum can be reused. Otherwise the water in the second washing drum cannot be reused. Water can be reused when the turbidity value or bubble concentration value of the water is within the set range.

In step 1, when the first washing drum reaches the water supply process, it is determined whether or not the water supply process being executed is a water supply for a last rinse. If yes, the first washing drum supplies clean water directly. If no, it is continued to compare the time $T_{22}$ for reaching the drainage process of the second washing drum and the time $T_{21}$ for reaching the next water supply process of the first washing drum. Thus it is ensured that the water supplied-in in the last rinse process is clean water, which ensures that the effect of washing clothes after washing.

In step 2, when the water in the second washing drum is drained into the first washing drum, it is determined whether or not the first washing drum executes the water supply process for washing. If yes, the first washing drum first supplies water for washing the detergent box. After the completion of water supply for washing the detergent box of the first washing drum, the water in the second washing drum is drained into the first washing drum. If no, the water in the second washing drum is drained into the first washing drum directly.

In step 2, when the water in the second washing drum is drained into the first washing drum, the height of the water level in the first washing drum is detected. If the water level in the first washing drum reaches the set water level value and there is water in the second washing drum, the remaining water in the second washing tub is discharged directly. If the water in the second washing drum is entirely drained into the first washing drum and the water level in the first washing tub does not reach the set water level value, then the first washing drum supplies clean water.

When the water in the second washing drum is drained away directly, it is determined whether or not the first washing drum is executing the dehydration process. If yes, the second washing drum waits until the dehydration process of the first washing drum is completed, and then drains. If no, it is determined a time for reaching the dehydration process of the first washing drum is $T_{41}$, a time taken for the first washing drum to dehydrate is $T_{44}$, and an allowable waiting time $T_4$ is set. If $T_{41}+T_{44}<T_4$, the second washing drum waits until the dehydration process of the first washing drum is completed, and then drains. Otherwise, the water of the second washing drum is drained directly.

It is also possible to determine whether or not the water in the first washing drum can be reused by determining the washing state and the washing times. In step 2, the water in the first washing drum cannot be reused, if the second washing drum is in a washing process when it drains and the first washing drum is in a rinse process when it supplies water; or if the first, second washing drums are both in the washing process when the second washing drum drains and the first washing drum supplies water, and washing times of the second washing drum is less than washing times of the first washing drum; or if the first, second washing drums are both in the rinse process when the second washing drum drains and the first washing drum supplies water, and rinsing times of the second washing drum is less than rinsing times of the first washing drum.

When the second washing drum reaches the water supply process, it is compared the time for reaching the drainage process of the first washing drum and the time for reaching the next water supply of the second washing drum, and it is determined whether or not the second washing drum waits until the first washing drum drains.

The drainage outlet of the second washing drum is communicated with the first washing drum, and the water in the second washing drum can be drained into the first washing drum to reuse. The drainage outlet of the second washing drum is provided with a holding valve, the water in the second washing drum can flow through the holding valve into the first washing drum. The first washing drum is provided with an inlet valve and the clean water can flow into the first washing drum through the inlet valve. The control method is as follows:

1) The first washing drum reaches the water supply process,
2) It is determined whether or not the water in the second washing drum can be reused, if yes, execute step 3), if no, execute step 6),
3) It is determined a time $T_{21}$ for reaching a next water supply process of the first washing drum, a time $T_{22}$ for reaching a drainage process of the second washing drum, if $T_{22}<T_{21}$, execute step 4), if $T_{22}≥T_{21}$, execute step 6),
4) The first washing drum waits until the second washing drum drains, execute step 5),
5) The water in the second washing drum is drained into the first washing drum,
6) The first washing drum supplies clean water directly and the water in the second washing drum is drained away directly.

The control method can also add a process of determining whether or not the second washing drum is draining water before comparing the time $T_{22}$ for reaching the drainage process of the second washing drum and the time $T_{21}$ for reaching the next water supply process of the first washing drum. The control method is as follows:

1) The first washing drum reaches the water supply process,
2) It is determined whether or not the water in the second washing drum can be reused, if yes, execute step 3), if no, execute step 7),
3) It is determined whether or not the second washing drum is executing the drainage process, if no, execute step 4), if yes, execute step 6),
4) It is determined a time $T_{21}$ for reaching a next water supply process of the first washing drum, a time $T_{22}$ for reaching a drainage process of the second washing drum, if $T_{22}<T_{21}$, execute step 5), if $T_{22}≥T_{21}$, execute step 7),
5) The first washing drum waits until the second washing drum drains, executes step 6),
6) The water in the second washing drum is drained into the first washing drum,
7) The first washing drum supplies clean water directly and the water in the second washing drum is drained away directly.

The control method may also include determining whether or not the first washing drum has enough time to wait the second washing drum draining, the control method is as follows:

1) The first washing drum reaches the water supply process,
2) It is determined whether or not the water in the second washing drum can be reused, if yes, execute step 3), if no, execute step 8),
3) It is determined whether or not the second washing drum is executing the drainage process, if no, execute step 4), if yes, execute step 7),
4) It is determined a time $T_{21}$ for reaching a next water supply process of the first washing drum, a time $T_{22}$ for reaching a drainage process of the second washing drum, if $T_{22}<T_{21}$, execute step 5), if $T_{22}≥T_{21}$, execute step 8),
5) an allowable waiting time $T_2$ is set, if $T_{22}<T_2$, execute step 6), if $T_{22}≥T_2$, execute step 8),
6) The first washing drum waits until the second washing drum drains, execute step 7),
7) The water in the second washing drum is drained into the first washing drum,
8) The first washing drum supplies clean water directly and the water in the second washing drum is drained away directly.

If the water in the second washing drum is too dirty or water supply process of the first washing drum is for the last rinse, the water in the second washing drum cannot be reused. The control method is as follows:

1) The first washing drum reaches the water supply process,
2) It is determined whether or not the first washing drum has only the last rinse left, if no, execute step 3), if yes, execute step 9),
3) It is determined whether or not the second washing drum is executing drainage process, if no, execute step 4), if yes, execute step 7),
4) It is determined a time $T_{21}$ for reaching a next water supply process of the first washing drum, a time $T_{22}$ for reaching a drainage process of the second washing drum, if $T_{22}<T_{21}$, execute step 5), if $T_{22}≥T_2$, execute step 9),
5) an allowable waiting time $T_2$ is set, if $T_{22}<T_2$, execute step 6), if $T_{22}≥T_2$, execute step 9),
6) The first washing drum waits until the second washing drum supplies water, execute step 7), 7) The turbidity value or the bubble concentration value of the water in the second washing drum is detected to determine whether or not the turbidity value or the bubble concentration value is smaller than the set value, if yes, execute step 8), if no, execute step 9), 8) The water in the second washing drum is drained into the first washing drum, 9) The first washing drum supplies clean water directly and the water in the second washing drum is drained away directly.

When the water in the second washing drum is drained into the first washing drum and if the water supply of the first washing drum is for washing, the detergent box need to be washed and water level need to be detected. The control method is as follows:

1) The first washing drum reaches the water supply process,

2) It is determined whether or not the first washing drum has only the last rinse left, if no, execute step 3), if yes, execute step 12), 3) It is determined whether or not the second washing drum is executing drainage process, if no, execute step 4), if yes, execute step 7), 4) It is determined a time $T_{21}$ for reaching a next water supply process of the first washing drum, a time $T_{22}$ for reaching a drainage process of the second washing drum, if $T_{22}<T_{21}$, execute step 5), if $T_{22} \geq T_{21}$, execute step 12), 5) An allowable waiting time $T_2$ is set, if $T_{22}<T_2$, execute step 6), if $T_{22} \geq T_2$, execute step 12), 6) The first washing drum waits until the second washing drum drains water, execute step 7), 7) The turbidity value or the bubble concentration value of the water in the second washing drum is detected to determine whether or not the turbidity value or the bubble concentration value is smaller than the set value, if yes, execute step 8), if no, execute step 12), 8) It is determined whether or not the first washing drum is executing the water supply process for washing, if yes, execute step 9), if no, execute step 10), 9) The first washing drum first supplies water for washing the detergent box, after the completion of water supply for washing the detergent box of the first washing drum, execute step 10), 10) The water in the second washing drum is drained into the first washing drum, 11) It is detected the height of the water level in the first washing drum. When the water level in the first washing drum reaches the set water level value and if there is still water left in the second washing drum, the left water is drained away directly. If the water level in the first washing drum still not reaches the set water level value after the water in the second washing drum is entirely drained into the first washing drum, water from outside is flooded into the first washing drum through the water inlet.

12) The first washing drum supplies clean water directly and the water in the second washing drum is drained away directly.

The first washing drum and the second washing drum of the present embodiment are only for the sake of convenience of the description, regardless of the order of the relationship. It may also to reuse the water in the first washing drum, the water inlet of the second washing drum is communicated with the drainage outlet of the first washing drum. The water in the first washing drum can be drained into the second washing drum for reuse. The drainage outlet of the first washing drum is provided with a holding valve and the water of the first washing drum can flow into the second washing drum through the holding valve. The second washing drum is provided with an inlet valve, clean water from outside can flow into the second washing drum through the inlet valve. When one washing drum reaches the water supply process, it is determined whether or not the water in the other washing drum is drained into the washing drum for reuse. And when the other washing drum reaches the water supply process, it doesn't need to consider the water reuse of the washing drum. It avoids causing an infinite loop of both washing drums waiting.

The control method is as follows:

1) The second washing drum reaches the water supply process,

2) It is determined whether or not the water in the first washing drum can be reused, if yes, execute step 3), if no, execute step 6), 3) It is determined a time $T_{21}$ for reaching a next water supply process of the second washing drum, a time $T_{22}$ for reaching a drainage process of the first washing drum, if $T_{22}<T_{21}$, execute step 4), if $T_{22} \geq T_{21}$, execute step 6), 4) The second washing drum waits until the first washing drum drains, execute step 5), 5) The water in the first washing drum is drained into the second washing drum, 6) The second washing drum supplies clean water directly and the water in the first washing drum is drained away directly.

The control method can also add a process of determining whether or not the first washing drum is draining before comparing the time $T_{22}$ for reaching the drainage process of the second washing drum and the time $T_{21}$ for reaching executing the next water supply process of the first washing drum. The control method is as follows:

1) The second washing drum reaches the water supply process,

2) It is determined whether or not the water in the first washing drum can be reused, if yes, execute step 3), if no, execute step 7), 3) It is determined whether or not the first washing drum is executing the drainage process, if no, execute step 4), if yes, execute step 6), 4) It is determined a time $T_{21}$ for reaching a next water supply process of the second washing drum, a time $T_{22}$ for reaching a drainage process of the first washing drum, if $T_{22}<T_{21}$, execute step 5), if $T_{22} \geq T_{21}$, execute step 7), 5) The second washing drum waits until the first washing drum drains, execute step 6), 6) The water in the first washing drum is drained into the second washing drum, 7) The second washing drum supplies clean water directly and the water in the first washing drum is drained away directly.

The control method may also include determining whether or not the second washing drum has enough time to wait the first washing drum to drain, the control method is as follows:

1) The second washing drum reaches the water supply process,

2) It is determined whether or not the water in the first washing drum can be reused, if yes, execute step 3), if no, execute step 8), 3) It is determined whether or not the first washing drum is executing the drainage process, if no, execute step 4), if yes, execute step 7), 4) It is determined a time $T_{21}$ for reaching a next water supply process of the second washing drum, a time $T_{22}$ for reaching a drainage process of the first washing drum, if $T_{22}<T_{21}$, execute step 5), if $T_{22}\geq T_{21}$, execute step 8), 5) An allowable waiting time $T_2$ is set, if $T_{22}<T_2$, execute step 6), if $T_{22}\geq T_2$, execute step 8), 6) The second washing drum waits until the first washing drum drains, execute step 7), 7) The water in the first washing drum is drained into the second washing drum, 8) The second washing drum supplies clean water directly and the water in the first washing drum drains away directly.

If the water in the first washing drum is too dirty or water supply process of the second washing drum is for the last rinse, the water in the first washing drum cannot be reused. The control method is as follows:

1) The second washing drum reaches the water supply process,

2) It is determined whether or not the second washing drum has only the last rinse left, if yes, execute step 3), if no, execute step 9), 3) It is determined whether or not the first washing drum is executing the drainage process, if no, execute step 4), if yes, execute step 7), 4) It is determined a time $T_{21}$ for reaching a next water supply process of the second washing drum, a time $T_{22}$ for reaching a drainage process of the first washing drum, if $T_{22}<T_{21}$, execute step 5), if $T_{22}\geq T_{21}$, execute step 9), 5) An allowable waiting time $T_2$ is set, if $T_{22}<T_2$, execute step 6), if $T_{22}\geq T_2$, execute step 9), 6) The second washing drum waits until the first washing drum drains, execute step 7), 7) The turbidity value or the bubble concentration value of the water in the first washing drum is detected to determine whether or not the turbidity value or the bubble concentration value is smaller than the set value, if yes, execute step 8), if no, execute step 9), 8) The water in the first washing drum is drained into the second washing drum, 9) The second washing drum supplies clean water directly and the water in the first washing drum is drained away directly.

When the water of the first washing drum is drained into the second washing drum and if the water supply of the second washing drum is for washing, the detergent box need to be washed and water level need to be detected. The control method is as follows:

1) The second washing drum reaches the water supply process,

2) It is determined whether or not the second washing drum only has water supply for the last rinse left, if no, execute step 3), if yes, execute step 12), 3) It is determined whether or not the first washing drum is executing the drainage process, if no, execute step 4), if yes, execute step 7), 4) It is determined a time $T_{21}$ for reaching a next water supply process of the second washing drum, a time $T_{22}$ for reaching a drainage process of the first washing drum, if $T_{22}<T_{21}$, execute step 5), if $T_{22}\geq T_{21}$, execute step 12), 5) An allowable waiting time $T_2$ is set, if $T_{22}<T_2$, execute step 6), if $T_{22}\geq T_2$, execute step 12), 6) The second washing drum waits until the first washing drum drains, execute step 7), 7) The turbidity value or the bubble concentration value of the water in the first washing drum is detected to determine whether or not the turbidity value or the bubble concentration value is smaller than the set value, if yes, execute step 8), if no, execute step 12), 8) It is determined whether or not the second washing drum is executing the water supply process for washing, if yes, execute step 9), if no, execute step 10), 9) The second washing drum first supplies water for washing the detergent box, after the completion of water supply for washing the detergent box of the second washing drum, execute step 10), 10) The water in the first washing drum is drained into the second washing drum, 11) It is detected the height of the water level in the second washing drum. When the water level in the second washing drum reaches the set water level value and if there is still water left in the first washing drum, the left water is drained away directly. If the water level in the second washing drum still not reaches the set water level value after the water in the first washing drum is entirely drained into the second washing drum, clean water is flooded into the second washing drum, 12) The second washing drum supplies clean water directly and the water in the first washing drum is drained away directly.

Embodiment 3

Figure 4:
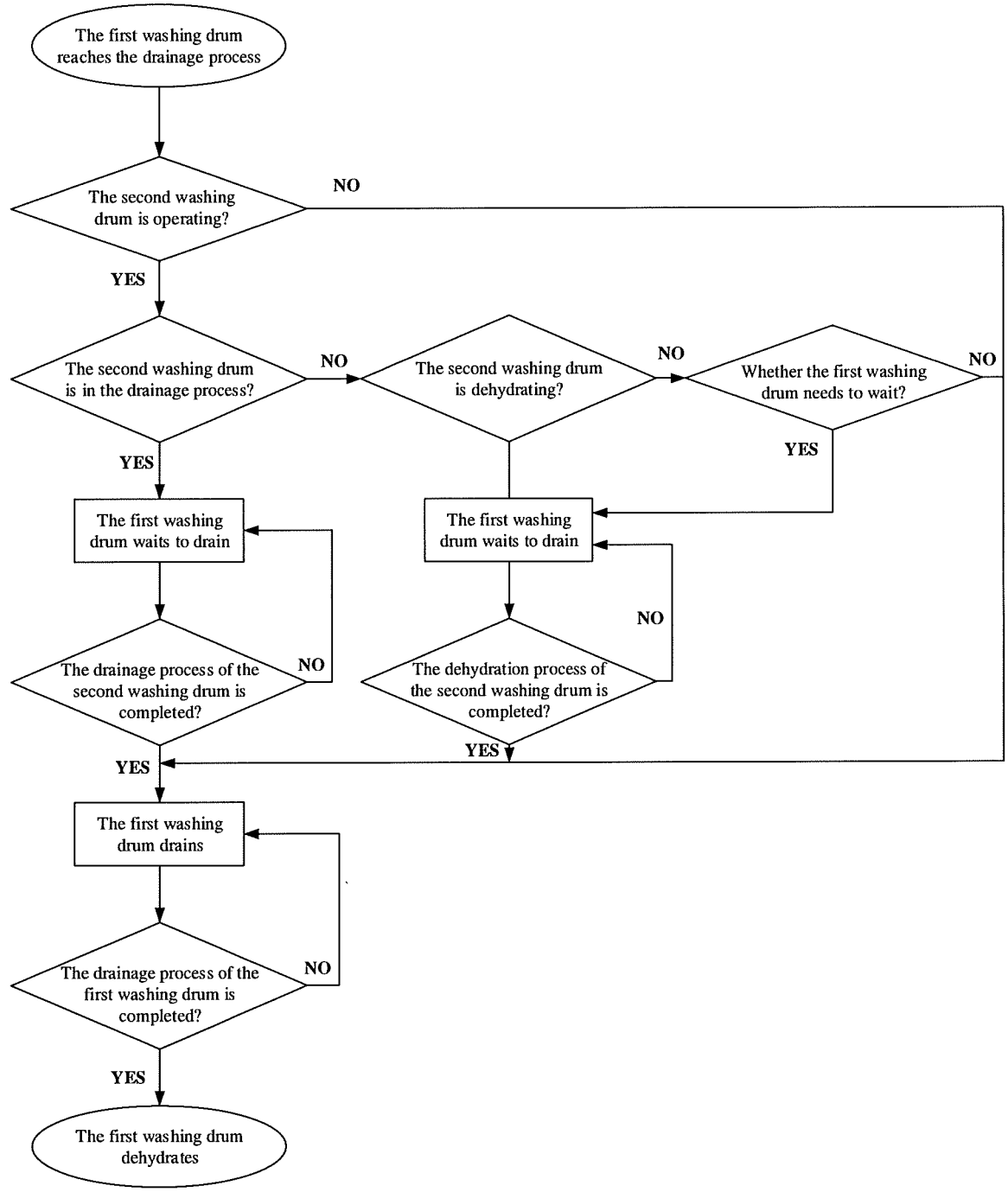

As shown in FIG. 4, the drainage control method of a multi-drum washing machine is provided. When the first washing drum reaches the drainage process, it is determined whether or not the second washing drum is in a dehydration process. If the second washing drum is in the dehydration process, the first washing drum waits until the dehydration process of the second washing drum is completed, and then drains. The water in the first washing drum plays a role as a counterweight, thus it increases the overall weight of the washing machine to achieve the effect of vibration absorption.

If the second washing drum is not in the dehydration process, it is determined whether or not to wait until the dehydration process is completed, and drain. Thus, it can avoid the scenario that the second washing drum starts to dehydrate as soon as the first washing drum finished draining water. Under that scenario, the water in the first washing drum cannot achieve the effect of vibration absorption, resulting waste.

To determine whether or not to wait until the dehydration process is completed, and then drain: a time for reaching the dehydration process of the second washing drum is $T_{32}$, a time taken for the second washing drum to dehydrate is $T_{33}$, an allowable waiting time is $T_3$. If $T_{32}<T_3-T_{33}$, which means it is within a range of the allowable waiting time, the first washing drum waits until the dehydration process of the second washing drum is completed, and then drains. Otherwise, the water of the first washing drum is drained directly.

Since draining outlets of the first washing drum and the second washing drum are connected to a drainage outlet of the washing machine through a pipe line, and the entire washing machine has only one drainage outlet. When the two washing drums drain at the same time, it will cause contamination to clothes due to the water reflux caused by the pressure difference. And the speeds of drainage at the same time and at different times are essentially the same while they share the same drainage pipe, so the first washing drum and the second washing drum cannot drain at the same time. When the first washing drum is about to drain, it is determined whether or not the second washing drum is draining at this time. If the second washing drum is draining at this time, the first washing drum waits until the drainage process of the second washing drum is completed, and then drains. Otherwise, the water in the first washing drum is drained directly.

In order to reuse the water in the first washing drum, when the first washing drum reaches the drainage process, it is determined whether or not the water in the first washing drum can be reused. If no, the water in the first washing drum is drained directly. If yes, it is determined whether or not the second washing drum is supplying water. If yes, the water in the first washing drum is drained into the second washing drum to reuse; if no, it is determined whether or not the first washing drum waits until the second washing drum supplies water.

To determine whether or not the first washing drum waits until the second washing drum supplies water: it is compared a time $T_{12}$ for reaching a water supply process of the second washing drum and a time $T_{11}$ for reaching a next drainage process of the first washing drum. If $T_{12}<T_{11}$, the first washing drum waits until a start of water supply process of the second washing drum, and the water in the first washing drum is drained into the second washing drum to reuse. If $T_{12} \geq T_{11}$, the water in the first washing drum is drained directly.

The determination process above may result in a longer waiting time, at this time, an allowable waiting time $T_1$, which $T_1 < T_{11}$, can be set. If $T_{12} < T_1$, which means that it is within the range of the allowable waiting time, the first washing drum waits the start of the water supply process of the second washing drum, and the water in the first washing drum is drained into the second washing drum directly to reuse. If $T_{12} \geq T_1$, which mean it is beyond the range of the allowable waiting time, and the water in the first washing drum is drained directly.

When it is determined whether or not the water in the first washing drum can be reused, the turbidity value or the bubble concentration value of the water in the first washing drum is detected. If the turbidity value or the bubble concentration value of the water is smaller than the set value, the water in the first washing drum can be reused. Otherwise the water in the first washing drum cannot be reused and is drained away directly.

When the first washing drum reaches the drainage process, it is determined whether or not the process of which the second washing drum is in progress or is about to be performed is a water supply for a last rinse. If yes, the water in the first washing drum is drained directly. If no, it is continued to be determined whether or not the water in the first washing drum can be reused.

The first washing drum and the second washing drum are only for the sake of convenience of the description, regardless of the order of the relationship. It is possible to determine whether or not the first washing drum is dehydrating at this time when the second washing drum is draining. If the first washing drum is dehydrating, the second washing drum waits after the dehydration of the first washing drum is completed, and drains. The water in the second washing drum plays the role as a counterweight which can increase the overall weight of the washing machine to achieve the effect of vibration absorption.

If the first washing drum is not draining at this time, it is determined whether or not to wait until the dehydration process is completed, and drain. Thus, it can avoid the scenario that the first washing drum starts to dehydrate as soon as the second washing drum finished draining water. Under that scenario, the water in the second washing drum cannot achieve the effect of vibration absorption, resulting waste.

As shown in FIG. 4, the control method of the present embodiment is:

1) the first washing drum reaching the drainage process,
2) determining whether or not the second washing drum is operating, if yes, executing step 3), if no, executing step 8),
3) determining whether or not the second washing drum is draining, if no, executing step 4), if yes, executing step 7),
4) determining whether or not the second washing drum is dehydrating, if no, executing step 5), if yes, executing step 6),
5) a time for reaching the dehydration process of the second washing drum being $T_{32}$, a time taken for the second washing drum to dehydrate being $T_{33}$, an allowable waiting time being set to $T_3$, If $T_{32} < T_3 - T_{33}$, executing step 6), otherwise executing step 8),
6) the first washing drum waiting until the dehydration of the second washing drum is completed, executing step 8),
7) the first washing drum waiting until the drainage of the second washing drum is completed, executing step 8),
8) the first washing drum draining.

While there has been shown preferable embodiments of the present disclosure, it is to be understood that various of variants and improvement can be made as would be known to one skilled in the art without departing from the underlying scope of the present invention as is discussed and set forth above and below including claims.

The invention claimed is:

1. A water reuse control method of a multi-drum washing machine, the multi-drum washing machine at least comprising a first washing drum and a second washing drum, wherein:
   when the first washing drum and the second washing drum are both in a working state at the same time, the water reuse control method is as follows:
   when the first washing drum reaches a drainage process, it is compared a time $T_{12}$ for reaching a water supply process of the second washing drum and a time for reaching a next drainage process of the first washing drum,
   if $T_{12} < T_{11}$, the first washing drum waits until a start of the water supply process of the second washing drum,
   if $Ti_2 \geq T_{11}$, water in the first washing drum is drained directly.

2. The water reuse control method of the multi-drum washing machine according to claim 1, wherein:
   an allowable waiting time $T_1$ is set, $T_1 < T_{11}$,
   it is compared the time $T_{12}$ for reaching the water supply process of the second washing drum and the allowable waiting time $T_1$,
   if $T_{12} < T_1$, the first washing drum waits until the second washing drum supplies water,
   if $T_{12} \geq T_1$, the water in the first washing drum is drained directly, preferably, a longest waiting time of the first washing drum is 30 mins.

3. The water reuse control method of the multi-drum washing machine according to claim 1, wherein:
   it is determined whether or not the water in the first washing drum can be reused before comparing the time $T_{12}$ for reaching the water supply process of the second washing drum and the time $T_{11}$ for reaching the next drainage process of the first washing drum,
   if no, the water in the first washing drum is drained directly, if yes, it is compared the time $T_{12}$ for reaching the water supply process of the second washing drum and the time $T_{11}$ for reaching the next drainage process of the first washing drum;

or, it is determined whether or not the water in the first washing drum can be reused when the first washing drum waits until the second washing drum supplies water, if no, the water in the first washing drum is drained directly, if yes, the water in the first washing drum is drained into the second washing drum for reusing.

4. The water reuse control method of the multi-drum washing machine according to claim 1, wherein:
if the second washing drum is supplying water when the first washing drum reaches the drainage process, the time $T_{12}$ for reaching the water supply process of the second washing drum is 0, and no need to wait.

5. The water reuse control method of the multi-drum washing machine according to claim 1, wherein:
when the first washing drum reaches the drainage process, it is determined whether or not a process of which the second washing drum is in progress or is about to be performed is a water supply for a last rinse,
if yes, the water in the first washing drum is drained directly,
if no, it is continued to be determined whether or not the water in the first washing drum can be reused.

6. The water reuse control method of the multi-drum washing machine according to claim 1, wherein:
before the water in the first washing drum is drained into the second washing drum, it is determined whether or not the second washing drum executes a water supply process for washing,
if yes, the second washing drum first supplies water for washing a detergent box,
after the completion of water supply for washing the detergent box of the second washing drum, the water in the first washing drum is drained into the second washing drum,
if no, the water in the first washing drum is drained into the second washing drum directly.

7. The water reuse control method of the multi-drum washing machine according to claim 1, wherein:
when the water in the first washing drum is drained into the second washing drum, a height of a water level in the second washing drum is detected,
if the water level in the second washing drum reaches a set water level value, there is water in the first washing drum, and a remaining water in the first washing drum is discharged directly,
if the water in the first washing drum is entirely drained into the second washing drum and the water level in the second washing drum does not reach the set water level value, then the second washing drum supplies clean water.

8. The water reuse control method of the multi-drum washing machine according to claim 1, wherein:
when the water in the first washing drum is drained away directly, it is determined whether or not the second washing drum is executing a dehydration process,
if yes, the first washing drum waits until the dehydration process of the second washing drum is completed, and then drains,
if no, it is determined a time $T_{32}$ for reaching the dehydration process of the second washing drum and a time $T_{33}$ taken for the second washing drum to dehydrate, an allowable waiting time $T_3$ is set,
if $T_{32}+T_{33}<T_3$, the first washing drum waits until the dehydration process of the second washing drum is completed, and then drains, otherwise, the water in the first washing drum is drained directly.

9. The water reuse control method of the multi-drum washing machine according to claim 1, wherein:
the water in the first washing drum cannot be reused,
if the first washing drum is in a washing process when draining and the second washing drum is in a rinse process when supplying water,
or if the first washing drum and the second washing drum are both in the washing process when the first washing drum drains and the second washing drum supplies water, and washing times of the first washing drum is less than washing times of the second washing drum,
or if the first washing drum and the second washing drum are both in the rinse process when the first washing drum drains and the second washing drum supplies water, and rinsing times of the first washing drum is less than rinsing times of the second washing drum.

10. The water reuse control method of the multi-drum washing machine according to claim 1, wherein:
when the second washing drum reaches a drainage process, it is compared a time for reaching a water supply process of the first washing drum and a time for reaching a next drainage process of the second washing drum, it is determined whether or not the second washing drum waits until the first washing drum executes the water supply process.

11. A water reuse control method of a multi-drum washing machine, the multi-drum washing machine at least comprising a first washing drum and a second washing drum, wherein:
when the first washing drum and the second washing drum are both in a working state at the same time, the control method for water reuse is as follows:
when the first washing drum reaches a water supply process, it is compared a time $T_{22}$, for reaching a drainage process of the second washing drum and a time $T_{21}$, for reaching a next water supply process of the first washing drum,
if $T_{22} \geq T_{21}$, the first washing drum supplies clean water directly,
if $T_{22}<T_{21}$, the first washing drum waits until a start of the drainage process of the second washing drum.

12. The water reuse control method of the multi-drum washing machine according to claim 11, wherein:
an allowable waiting time $T_2$ is set, which $T_2<T_{21}$, it is compared the time $T_{22}$ for reaching the drainage process of the second washing drum and the setting allowable waiting time $T_2$,
if $T_{22}<T_2$, the first washing drum waits until the second washing drum drains,
if $T_{22} \geq T_2$, the first washing drum supplies clean water directly, preferably, a longest waiting time of the first washing drum is 30 mins.

13. The water reuse control method of the multi-drum washing machine according to claim 11, wherein:
it is determined whether or not water in the second washing drum can be reused before comparing the time $T_{22}$ for reaching the drainage process of the second washing drum and the time $T_{21}$ for reaching the next water supply process of the first washing drum,
if no, the first washing drum supplies clean water directly,
if yes, it is compared the time $T_{22}$ for reaching the drainage process of the second washing drum and the time $T_{21}$ for reaching the next water supply process of the first washing drum, or, it is determined whether or not the water in the second washing drum can be reused when the first washing drum waits until a start of the drainage process of the second washing drum, if no, the first washing drum supplies clean water directly, if yes, the water in the second washing drum is drained into the first washing drum for reuse.

14. The water reuse control method of the multi-drum washing machine according to claim 11, wherein:

if the second washing drum is draining water when the first washing drum reaches the water supply process, the time $T_{22}$ for reaching the drainage process of the second washing drum is 0, and no need to wait.

15. The water reuse control method of the multi-drum washing machine according to claim 11, wherein:

when the first washing drum reaches a water supply process, it is determined whether or not the water supply process being executed is a water supply for a last rinse, if yes, the first washing drum supplies clean water directly, if no, it is continued to compare the time T22 for reaching the drainage process of the second washing drum and the time T21 for reaching the next water supply process of the first washing drum.

16. The water reuse control method of the multi-drum washing machine according to claim 11, wherein:

before water in the second washing drum is drained into the first washing drum, it is determined whether or not the first washing drum executes a water supply process for washing, if yes, the first washing drum first supplies water for washing a detergent box, after a completion of the water supply for washing the detergent box of the first washing drum, the water in the second washing drum is drained into the first washing drum, if no, the water in the second washing drum is drained into the first washing drum directly.

17. The water reuse control method of the multi-drum washing machine according to claim 11, wherein:

when the water in the second washing drum is drained into the first washing drum, a height of a water level in the first washing drum is detected, if the water level in the first washing drum reaches a set water level value and there is water in the second washing drum, a remaining water in the second washing tub is discharged directly, if the water in the second washing drum is entirely drained into the first washing drum and the water level in the first washing tub does not reach the set water level value, the first washing drum supplies clean water.

18. The water reuse control method of the multi-drum washing machine according to claim 11, wherein:

before water in the second washing drum is drained away directly, it is determined whether or not the first washing drum is executing a dehydration process, if yes, the second washing drum waits until the dehydration process of the first washing drum is completed, and then drains, if no, it is determined a time $T_{41}$ for reaching the dehydration process of the first washing drum and a time $T_{44}$ taken for the first washing drum to dehydrate, and an allowable waiting time $T_4$ is set, if $T_{41}+T_{44}<T_4$, the second washing drum waits until the dehydration process of the first washing drum is completed, and then drains, otherwise, the water in the second washing drum is drained directly.

19. The water reuse control method of the multi-drum washing machine according to claim 11, wherein:

water in the first washing drum cannot be reused, if the second washing drum is in a washing process when drains and the first washing drum is in a rinse process when supplies water;

or if the first, second washing drums are both in the washing process when the second washing drum drains and the first washing drum supplies water, and washing times of the second washing drum is less than washing times of the first washing drum;

or if the first, second washing drums are both in the rinse process when the second washing drum drains and the first washing drum supplies water, and rinsing times of the second washing drum is less than rinsing times of the first washing drum.

20. The water reuse control method of the multi-drum washing machine according to claim 11, wherein:

when the second washing drum reaches a water supply process, it is compared a time for reaching the drainage process of the first washing drum and a time for reaching the next water supply of the second washing drum, it is determined whether or not the second washing drum waits until the first washing drum drains.

* * * * *